United States Patent [19]

Reinsma

[11] 3,854,345

[45] Dec. 17, 1974

[54] NOISE ATTENUATING IMPACT ABSORBING MEANS FOR SPROCKET TEETH AND TRACK

[75] Inventor: Harold L. Reinsma, Dunlap, Ill.

[73] Assignee: Caterpillar Tractor Co., Peoria, Ill.

[22] Filed: Mar. 20, 1974

[21] Appl. No.: 453,091

[52] U.S. Cl. .................. 74/243 R, 74/443, 74/461, 305/13
[51] Int. Cl. .......................................... F16h 55/30
[58] Field of Search ..... 74/243 R, 243 NC, 243 FC, 74/243 PC, 243 S, 443, 461; 305/13, 38, 57, 10, 54

[56] References Cited
UNITED STATES PATENTS

| 782,628 | 2/1905 | Taylor | 74/461 |
|---|---|---|---|
| 2,161,913 | 6/1939 | Doyle | 74/243 R |
| 2,596,501 | 5/1952 | Montgomery | 74/243 PC |
| 3,499,340 | 3/1970 | Teranishi et al. | 74/243 PC |
| 3,730,013 | 5/1973 | Slemmons | 74/243 FC |
| 3,762,463 | 10/1973 | Sakaki et al. | 74/443 |

FOREIGN PATENTS OR APPLICATIONS

| 23,659 | 8/1895 | Great Britain | 74/243 R |
|---|---|---|---|
| 494,794 | 3/1954 | Italy | 74/243 R |
| 13,943 | 8/1895 | Great Britain | 74/243 R |

*Primary Examiner*—Samuel Scott
*Assistant Examiner*—Allan Russell Burke
*Attorney, Agent, or Firm*—Phillips, Moore, Weissenberger, Lempio & Strabala

[57] ABSTRACT

A noise attenuating impact absorbing system for noise reduction and shock absorption in track laying vehicles. A plurality of devices are mounted within the teeth of the vehicle drive sprocket. Each device includes a spring means mounted within a radial bore for coacting with a plunger to which is removably attached a threaded bolt. Resilient seal means surroundingly engage the bolt and plunger and effectively close-off the bore from ingress of abrasive recrement potentially damaging to the spring. A device also includes a rigid washer member and sleeve flange portion which partially protectively cover the seal means to guard against impact damage. A track chain with which the inventive sprocket devices are associated is equipped with a plurality of bolts which are removably attached to the track link means between adjacent pairs of track bushings. The track mounted bolts are adapted to directly engage the bolts of the sprocket teeth devices to transmit impact forces thereto. The track bolts are equipped with shim means for adjustment thereof.

17 Claims, 2 Drawing Figures

PATENTED DEC 17 1974 3,854,345

NOISE ATTENUATING IMPACT ABSORBING MEANS FOR SPROCKET TEETH AND TRACK

BACKGROUND OF THE INVENTION

Recent legislation applicable to earthworking vehicles has imposed stringent limitations upon the noise levels to which operators of such vehicles and bystanders may be exposed. To adequately meet these limitations and to protect persons and environment from excessive noise levels, acoustical treatment systems for noise producing components of such earthworking vehicles have developed. Examples of such noise attenuation systems are found in U.S. Pat. No. 3,762,489 to Proksch et al., of common assignment herewith, and in U.S. Applications Ser. No. 420,720 and 416,828 to Hazlett et al. and Boggs et al. respectively, also of common assignment herewith.

The particular noise producing components treated herein are the tracks and sprocket wheels of track laying vehicles. A major portion of noise in such vehicles is created by the impact of engagement of the track chain bushings and the notches of the sprocket wheel as such track chain is being driven thereabout. In prior art systems, such offensive noise was generated by the metal-to-metal contact of the track bushings and notches of the rotating sprocket.

Track-laying systems wherein some means are provided for cushioning this effect are described in U.S. Pat. Nos. 2,003,528; 2,412,122; and 3,057,219 to Best, Campbell and Montgomery respectively.

It is obviously highly desirable to provide economical and efficient noise suppression means for the sprocket wheel and chain of track-laying vehicles which means are capable of withstanding the wear and severe impact forces generated in such components. It is particularly important to provide impact absorbing-noise attenuation means which are themselves protected from the deleterious environmental conditions in which track-laying vehicles often operate.

SUMMARY AND OBJECTS OF THE INVENTION

The present invention provides noise attenuating-impact absorbing means for cushioning the impact of track bushings upon the notches of drive sprocket wheels with consequent noise reduction in track vehicles. The system includes a plurality of impact absorbing devices mounted within the teeth portions of the sprocket wheel. Each device includes a removable bolt threadably attached to a plunger means which reciprocates within a bore in said tooth portion. The plunger means is biased radially outwardly with respect to the sprocket by means of spring means and is centered within the bore by means of an elastomeric seal member. Such seal member also closes-off the bore means and protects the spring means from deleterious abrasive materials. A rigid washer is provided between the plunger means and the bolt head for partially closing the bore to provide substantial protection from impact damage for the seal means. The sprocket tooth device may be used in conjunction with removable contact members in the form of bolts mounted upon the track chain associated with the sprocket wheel. Such removable bolts on the track chain would also include shim means for adjustment thereof.

It is an object of the present invention to provide economical, effective noise suppression means for substantially reducing noises emanating from the forceful engagement of track bushings with sprocket wheel notches.

It is another object of the present invention to provide a plurality of noise reducing impact absorbing devices disposed circumferentially about a sprocket wheel betwixt the notches thereof for engaging the track chain prior to the successive engagement of the bushings with such notches.

A further object of the invention is to provide such a noise attenuating impact absorbing device wherein compression springs absorb the impact associated with engagement of the track chain with the sprocket notches wherein such compression springs are completely sealed from the environment for longer service life.

Still another object of the present invention is to provide a track chain for use with such a sprocket wheel which chain utilizes complementary engaging bolts as impact members; which bolts are readily adjustable and replaceable in use.

Yet another object of the present invention is to provide a device which includes a flanged cylindrical sleeve member and a washer which form a rock guard for protecting the seal means.

Another object of the present invention is to provide such a device which includes plunger means having a bushing portion which coacts with the seal member to center the impact absorbing device within its mounting bore.

Other objects and advantages of the invention will become apparent from the following description and drawing.

DETAILED DESCRIPTION

Figure 1:
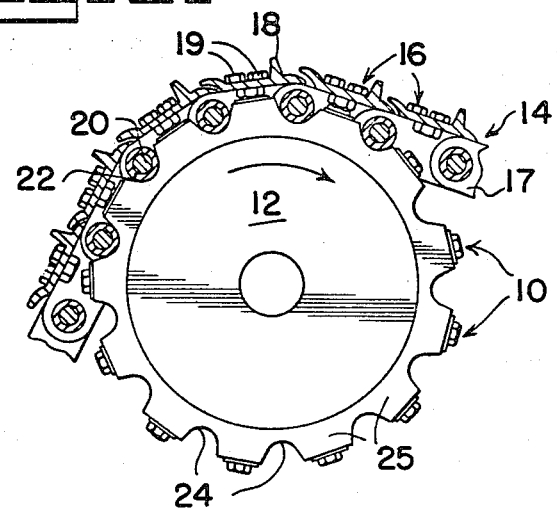
FIG. 1 is a partial elevation of a track-laying vehicle showing a sprocket wheel and a portion of an engaging track chain.

With reference to the drawing, the noise suppressing-impact absorbing means of the present invention are indicated generally at 10 and are shown in association with a drive sprocket 12 and an endless track chain 14 for a track-type vehicle.

The endless track chain is constructed in the usual manner from a plurality of track sections 16 each consisting of a pair of laterally spaced link members 17, one shown, and a track shoe member 18 which is secured to the link by means of bolts 19. Adjacent track sections are articulately coupled together by means of pins 20 and bushings 22.

Sprocket 12 includes a plurality of circumferentially disposed angularly spaced notches 24 which are adapted to receive track bushings 22. The notches are spaced apart a distance corresponding to the pitch length of each of the track links so that the sprocket is provided with a single set of drive teeth 25 rather than the more usual double set of "hunting" type teeth.

Figure 2:
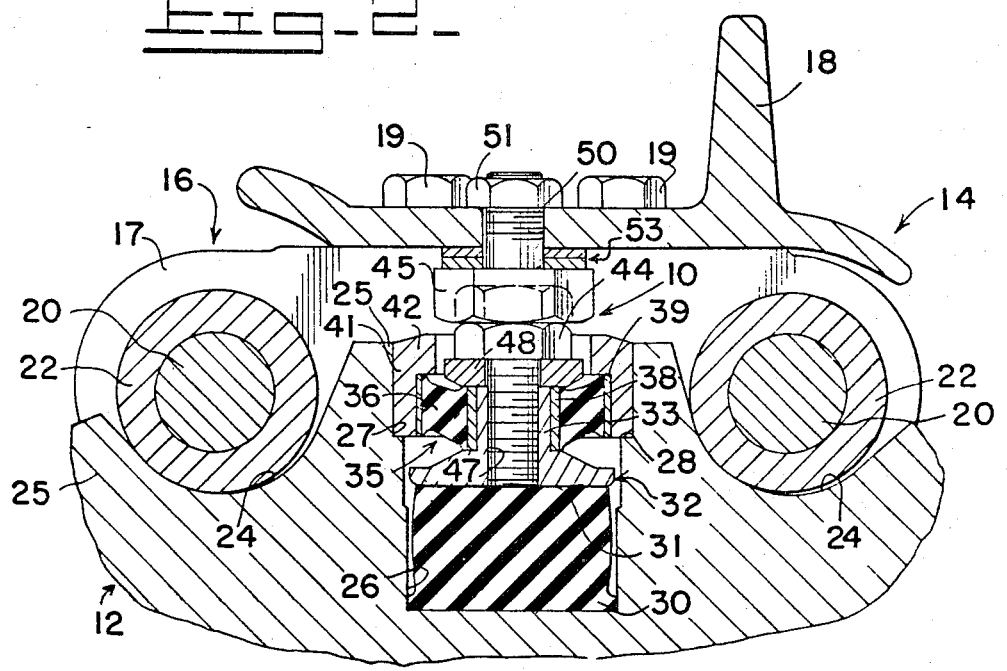
FIG. 2 is an enlarged partially cut-away sectional view of a portion of the sprocket wheel and chain shown in FIG. 1.

A plurality of radial bore means, one of which is shown at 26 in FIG. 2, are formed within the sprocket teeth 25 for receiving the noise attenuating impact absorbing devices of the present invention. Each bore means is provided with a counter bore 27 having a shoulder 28 projecting therefrom.

Disposed within the bore means, the device 10 includes a compression spring means 30 which could be an element of elastomeric material such as rubber or the like and which is placed at the closed bottom end of the bore means. The radially outermost portion of the spring means 30 is engaged by plunger means 32 which include a flat piston portion 31 and an elongated cylindrical portion 33 extending therefrom. A sealing assembly 35 is provided and includes an annular bushing member 36 composed of elastomeric material which could be of the same type from which the spring means 30 is composed. The annular bushing member 36 is bonded between an inner cylindrical sleeve member 38 and an outer cylindrical sleeve member 39. The inner sleeve member 38 is press-fitted about the elongated portion 33 of the plunger means 32 for sealing the space between the bore and the plunger means. A cylindrical sleeve member 41 is press-fitted into the counterbore 27 and bottomed against the shoulder 28 thereof. The radially outermost portion of the sleeve 41 is provided with an annular flange 42 which extends inwardly towards the axis of the plunger means 32. The outer sleeve member 39 of the seal assembly is press-fitted into the sleeve member 41 as shown.

Each device 10 also includes a replaceable impact member consisting of a bolt 44 which is threadably received in the plunger 32 and is movable therewith. The bolt 44 resides within a threaded aperture 47 provided in the plunger means 32. A rigid washer member 48 is interposed between the head of the bolt 44 and the radially outermost portion of the elongated plunger portion 33. The washer has its outer diameter portion closely adjacent to the flange 42 to cooperate therewith to form a rock guard for protecting the sealing assembly 35 against impact damage.

On the track chain 14, a bolt 45 is mounted through an aperture 50 formed through the track shoe 18 and secured thereto by the means of a nut 51. Shims 53 may be disposed between the head of the bolt 45 and the track chain for adjustment purposes. Such shims, while not shown, could also be suitably disposed between the head of the bolt 44 and the washer 48 for the same adjustment purpose.

OPERATION

As the drive sprocket 12 is rotated to drive the track chain 14 thereabout, each successive bushing 22 engages a notch 24 in the sprocket. Normally, such bushing impacts upon the notch with considerable force and concomitant wear and undesirable noise. In the present invention, however, the initial impact occurs between the bolts 44 and 45 prior to the engagement of the bushings and notches. The energy of such impact is transmitted through the plunger means 32 to the compression spring means 30 for absorption thereof with consequent reduction in noise.

The life of the compression spring 30 is greatly increased by the seal assembly 35 which prevents ingress of abrasive materials to the bore means 26. The seal assembly is itself protected from impact damage from rocks and other recrement by means of the close fitting relationship between the washer 48 and the flange 42 of the cylindrical sleeve member 41. The sealing assembly 35 also functions to center the plunger means 32 within the bore means 26.

Although the invention has been described with reference to the preferred embodiments, it is apparent that alternate embodiments are possible within the spirit of the inventive concepts. No limitations with respect to such alternate embodiments are intended except as defined by the scope of the appended claims.

I claim:

1. A drive sprocket for a track-laying vehicle having a plurality of equiangularly spaced teeth and notches and having impact absorbing noise suppressing means comprising; spring means mounted circumferentially about said sprocket within at least one of said plurality of teeth for absorbing impact energy, first contact means separate from said spring means and mounted radially outwardly from said spring means within said at least one tooth for coacting with said spring means and for transmitting impact forces to said spring means for absorption thereof, seal means mounted within said at least one tooth radially between a portion of said first contact means and said spring means for protectively sealing said spring means.

2. The invention of claim 1 wherein said first contact means include plunger means movable radially with respect to said tooth, said plunger means in direct engagement with said spring means for respectively storing and releasing energy in said spring means upon movement of said contact means.

3. The invention of claim 2 wherein said first contact means further include bolt means for removable connection with said plunger means for movement therewith.

4. The invention of claim 3 wherein said impact absorbing noise suppressing means are disposed within radially disposed cylindrical bore means in said tooth, said seal means including an annular bushing member fabricated from elastomeric material.

5. The invention of claim 4 wherein said annular bushing member has a centrally disposed aperture therein for receiving a portion of said bolt means therethrough.

6. The invention of claim 5 wherein said aperture also receives a portion of said plunger means therethrough, said impact absorbing noise suppressing means further including sleeve means firmly mounted within said bore means for receiving a radially outwardly extending peripheral edge portion of said annular bushing member to secure said annular bushing member within said bore means.

7. The invention of claim 6 wherein said sound absorbing noise suppressing means further include rigid guard means disposed upon said bolt means and said plunger means and movable therewith relative to said sleeve means for protecting said elastomeric annular bushing member from impact damage.

8. The invention of claim 3 wherein said bolt means include a threaded bolt having an enlarged head portion and a shank portion, said shank portion being screw threadably received within a threaded passage of said plunger means for ready selective removal of said bolt from said plunger means.

9. The invention of claim 1 in combination with a track having a plurality of track link means each with adjacent track bushings adapted to be drivingly received within said notches of said sprocket, at least one of said track link means having second contact means for contacting said first contact means and for transmitting impact forces thereto, said second contact means including a member removably attached to said at least one track link means between an adjacent pair of track bushings.

10. The invention of claim 9 wherein said first contact means include plunger means movable radially with respect to said tooth, said plunger means in direct engagement with said spring means upon movement of said contact means.

11. The invention of claim 10 wherein said first contact means further include bolt means for removable connection with said plunger means for movement therewith.

12. The invention of claim 11 wherein said impact absorbing noise suppressing means are disposed within radially disposed cylindrical bore means in said tooth, said seal means including an annular bushing member fabricated from elastomeric material.

13. The invention of claim 5 wherein said annular bushing member has a centrally disposed aperture therein for receiving a portion of said bolt means therethrough.

14. The invention of claim 13 wherein said aperture also receives a portion of said plunger means therethrough, said impact absorbing noise suppressing means further including sleeve means firmly mounted within said bore means for receiving a radially outwardly extending peripheral edge portion of said annular bushing member to secure said annular bushing member within said bore means.

15. The invention of claim 14 wherein said sound absorbing noise suppressing means further include rigid guard means disposed upon said bolt means and said plunger means and movable therewith relative to said sleeve means for protecting said elastomeric annular bushing member from impact damage.

16. The invention of claim 11 wherein said bolt means include a threaded bolt having an enlarged head portion and a shank portion, said shank portion being screw threadedly received within a threaded passage of said plunger means for ready selective removal of said bolt from said plunger means.

17. The invention of claim 9 wherein said second contact means include a threaded bolt removably attached to said track link means by means of a nut, shim means between said bolt and said track link means for adjustment of said bolt relative to said track link means.

* * * * *

UNITED STATES PATENT OFFICE
CERTIFICATE OF CORRECTION

Patent No. 3,854,345  Dated December 17, 1974

Inventor(s) Harold L. Reinsma

It is certified that error appears in the above-identified patent and that said Letters Patent are hereby corrected as shown below:

In column 3, after line 65, the following paragraph should be inserted:

--In addition to absorbing impact forces and attenuating noise, the instant system also exerts a radially outward force against the track chain 14 which causes the bushings thereof which are not in full driving engagement with the sprocket notches to be lifted sufficiently out of engagement with their respective notches to eliminate the "scrubbing" effect normally produced as the track chain wraps and unwraps from the sprocket. Thus, the instant invention provides an extremely important wear reducing function in a system in which abrasive wear is a paramount consideration.--

Signed and sealed this 8th day of April 1975.

(SEAL)
Attest:

RUTH C. MASON
Attesting Officer

C. MARSHALL DANN
Commissioner of Patents
and Trademarks